(12) United States Patent
Staats

(10) Patent No.: US 8,140,411 B2
(45) Date of Patent: Mar. 20, 2012

(54) DYNAMIC LINKING OF PART ITEMS TO REPAIR DATA

(76) Inventor: Glenn E. Staats, Austin, TX (US)

( * ) Notice: Subject to any disclaimer, the term of this patent is extended or adjusted under 35 U.S.C. 154(b) by 707 days.

(21) Appl. No.: 11/766,468

(22) Filed: Jun. 21, 2007

(65) Prior Publication Data

US 2007/0295800 A1    Dec. 27, 2007

Related U.S. Application Data

(60) Provisional application No. 60/805,841, filed on Jun. 26, 2006.

(51) Int. Cl.
*G06Q 10/00*    (2006.01)
*G06F 12/00*    (2006.01)
*G01M 17/00*   (2006.01)
*G06G 1/14*     (2006.01)

(52) U.S. Cl. ............... 705/28; 705/400; 705/22; 701/29

(58) Field of Classification Search ......................... None
See application file for complete search history.

(56) References Cited

U.S. PATENT DOCUMENTS

| 5,367,627 | A | 11/1994 | Johnson |
| 6,263,322 | B1 * | 7/2001 | Kirkevold et al. ............ 705/400 |
| 6,425,524 | B2 | 7/2002 | Pentel |
| 6,975,612 | B1 | 12/2005 | Razavi et al. |
| 7,155,321 | B2 * | 12/2006 | Bromley et al. ................. 701/29 |
| 2004/0034566 | A1 * | 2/2004 | Nagata ............................. 705/22 |

* cited by examiner

*Primary Examiner* — F. Zeender
*Assistant Examiner* — Denisse Ortiz Roman
(74) *Attorney, Agent, or Firm* — Meyertons Hood Kivlin Lowert & Goetzel, P.C.; Jeffrey C. Hood; Joel L. Steven

(57) ABSTRACT

Providing repair information for a part. A first website may be provided which includes part information. The part information may include at least one of a plurality of possible vehicles and/or a plurality of possible parts. First user input may be received to the first website specifying a vehicle from the plurality of possible vehicles. Second user input may be received specifying a part of the plurality of possible parts, and third user input may be received to view labor cost information associated with the part. Correspondingly, labor cost information may be automatically provided which is associated with the part in response to the third user input to the first website to view the labor cost information. Automatically providing the labor cost information may be performed without further user input specifying the part or another website.

18 Claims, 16 Drawing Sheets

| ▨ THE 00'S | ▨ THE 90'S | ▨ THE 80'S | ▨ THE 70'S | ▨ THE 60'S |
|---|---|---|---|---|
| - 2008 | - 1999 | - 1989 | - 1979 | - 1969 |
| - 2007 | - 1998 | - 1988 | - 1978 | - 1968 |
| - 2006 | - 1997 | - 1987 | - 1977 | - 1967 |
| - 2005 | - 1996 | - 1986 | - 1976 | - 1966 |
| - 2004 | - 1995 | - 1985 | - 1975 | - 1965 |
| - 2003 | - 1994 | - 1984 | - 1974 | - 1964 |
| - 2002 | - 1993 | - 1983 | - 1973 | - 1963 |
| - 2001 | - 1992 | - 1982 | - 1972 | - 1962 |
| - 2000 | - 1991 | - 1981 | - 1971 | - 1961 |
|  | - 1990 | - 1980 | - 1970 | - 1960 |

FIG. 6A

You are shopping for a: 1998

Please select a vehicle MAKE from the list below.

| | | | |
|---|---|---|---|
| - ACURA | - EAGLE | - LAFORZA | - PONTIAC |
| - AM-GENERAL | - FERRARI | - LAMBORGHINI | - PORSCHE |
| - ASTON MARTIN | - FORD | - LAND ROVER | - ROLLS ROYCE |
| - AUDI | - FORD MD TRUCK | - LEXUS | - SAAB |
| - AVANTI | - GENERAL MOTORS | - LINCOLN | - SATURN |
| - BENTLEY | - GMC | - LOTUS | - SHELBY |
| - BMW | - GMC MD TRUCK | - MASERATI | - SUBARU |
| - BUICK | - HONDA | - MAZDA | - SUZUKI |
| - CADILLAC | - HYUNDAI | - MERCEDES-BENZ | - TOYOTA |
| - CHEV. MD TRUCK | - INFINITI | - MERCURY | - VOLKSWAGEN |
| - CHEVROLET | - INTER. MD TRU | - MITSUBISHI | - VOLVO |
| - CHRYSLER | - ISUZU | - MORGAN | |
| - DAEWOO | - JAGUAR | - NISSAN/DATSUN | |
| - DODGE | - JEEP | - OLDSMOBILE | |
| | - KIA | - PLYMOUTH | |

FIG. 6B

You are shopping for a: 1998 FORD

Please select a vehicle MODEL from the list below.

- CONTOUR
- CONTOUR SVT
- CROWN VICTORIA
- ECONOLINE E150 1/2 TON
- ECONOLINE E250 3/4 TON
- ECONOLINE E350 1 TON
- ESCORT
- ESCORT ZX2
- EXPEDITION
- EXPLORER
- MUSTANG
- MUSTANG COBRA
- MUSTANG GT
- PICKUP F150 1/2 TON
- PICKUP F250 3/4 TON
- RANGER
- TAURUS
- TAURUS SHO
- VAN E SUPER DUTY
- WINDSTAR

FIG. 6C

You are shopping for a: 1998 FORD TAURUS

Please select a vehicle ENGINE from the list below.

- FORD TAURUS V6-182ci 3.0L F/I Vin S
- FORD TAURUS V6-182ci 3.0L F/I Vin U
- FORD TAURUS V6-182ci 3.0L FLEX/FI Vin 1
- FORD TAURUS V6-182ci 3.0L FLEX/FI Vin 2

FIG. 6D

☐ Radiator Fan Motors
☐ Sensors, Emission
☐ Sensors, Oxygen
☐ Shocks
☐ Spark Plugs
☐ Spark Plug Wires
☐ Starters, Solenoids, Relays & Switches
☐ Switches & Relays, Body
☐ Thermostats
☐ Tie Rod Ends, Idler Arms, & Sleeves
☐ Timing Chains/Belts & Kits
☐ Transmission, Manual
☐ Transmission, Automatic
☐ Tune-Up & Ignition
☐ U & CV Joints & Driveshafts
☐ Water Pumps
☐ Window Motors
☐ Wiper Bades
☐ Wiper Motors Parts >>

*FIG. 7*

| Status | Labor | Description | Part # | Years | Warr. | List | Cost | Extend | Qty | Order | Store | Network | DC |
|---|---|---|---|---|---|---|---|---|---|---|---|---|---|
| Engine > Timing Parts & Camshaft > ALL Timing chains/Belts & kits & Cover Sets | | | | | | | | | | | | | |
| CLOYES GEAR & PRODUCT, INC. | | | | | | | | | | | | | |
| ⊘ | L | Timing Chain | CLO C380<br>⊕ STD - SILENT TYPE CHAIN - 68L | 90-03 | LT | 59.31 | 34.99 | 34.99 | 1 | ☐ | | | ✓<br>DC |
| ⊘ | L | Iron Cam Gear | CLO S712T<br>⊕ STD - SILENT TYPE CHAIN - 46T | 90-03 | LT | 27.10 | 15.99 | 15.99 | 1 | ☐ | | | ✓<br>DC |
| ⊘ | L | Crank Gear | CLO S721<br>⊕ STD - SILENT TYPE CHAIN - 23T | 90-03 | LT | 12.69 | 7.49 | 7.49 | 1 | ☐ | | | ✓<br>DC |
| ⊘ | L | Iron 3 Piece Kit | CLO C3072<br>⊕ STD - SILENT TYPE CHAIN | 90-03 | LT | 67.78 | 39.99 | 39.99 | 1 | ☐ | | | ✓<br>DC |
| SEALED POWER | | | | | | | | | | | | | |
| [OHV – T ENG CODE – CNG or Y ENG CODE – LIGHT DUTY | | | | | | | | | | | | | |
| ⊘ | L | Timing Chain | SPO 222-380<br>⊕ SILENT TYPE | 92-01 | | Check with store for availability | | | 1 | ☐ | | | |
| ⊘ | L | Timing Chain | SPO 222-160<br>⊕ DOUBLE ROLLER | 90-97 | | Check with store for availability | | | 1 | ☐ | | | |
| ⊘ | L | Iron Cam Gear | SPO 223-712<br>⊕ SINGLE ROW - w/ SILENT TYPE CHAIN | 92-01 | | | | | 1 | ☐ | ✓<br>Store | ✓<br>Hub | |
| ⊘ | L | Iron Cam Gear | SPO 223-402<br>⊕ DOUBLE ROW | 90-97 | 90 | 49.14 | 26.42 | 26.42 | 1 | ☐ | Call for availability | | |
| ⊘ | L | Crank Gear | SPO 223-721<br>⊕ SINGLE ROW - w/ SILENT TYPE CHAIN | 92-01 | | Check with store for availability | | | 1 | ☐ | | | |

<Back     Add to Quote >

LaborLink

Please confirm the labor operations and parts you selected.

Labor Operations:

| Labor Description | | | Labor Rate | Cost | Time | Ext List | Ext Cost | Trans |
|---|---|---|---|---|---|---|---|---|
| New Labor: | | | | | | | | |
| ☑ TIMING CHAIN - R&R -- 5.2L Eng | | | 60.00 | 35.00 | 3.1 | 186.00 | 108.50 | ☑ |
| ☑ (Additional Time) Where Air Cond interferes add | | | 60.00 | 35.00 | 0.4 | 24.00 | 14.00 | ☑ |
| ☑ (Combination) CAMSHAFT GEAR OR SPROCKET - R&R | | | 60.00 | 35.00 | 0.1 | 6.00 | 3.50 | ☑ |
| ☑ (Combination) CRANKSHAFT GEAR OR SPROCKET - R&R | | | 60.00 | 35.00 | 0.2 | 12.00 | 7.00 | ☑ |

Part Types:

| Description | Part # | Wty | List | Cost | Qty | Ext List | Ext Cost | Location | Urgent | Trans |
|---|---|---|---|---|---|---|---|---|---|---|
| Currently in Quote: | | | | | | | | | | |
| ☑ Iron 3 Piece Kit | C3072 | LT | 67.78 | 39.99 | 1 | 67.78 | 39.99 | Store | No | ☑ |
| New Parts: | | | | | | | | | | |
| No new parts were selected | | | | | | | | | | |
| Total Labor: | | | | | | 228.00 | 133.00 | | | |
| Total Parts: | | | | | | 67.78 | 39.99 | | | |
| Total Labor & Parts: | | | | | | 295.78 | 172.99 | | | |

[Cancel] [Back]  [Return to Active Quote]

*FIG. 15*

DYNAMIC LINKING OF PART ITEMS TO REPAIR DATA

PRIORITY INFORMATION

This application claims benefit of priority of U.S. provisional application Ser. No. 60/805,841, titled "Dynamic Linking of Part Items to Repair Data", filed on Jun. 26, 2006, whose inventor is Glenn E. Staats, and which is hereby incorporated by reference in its entirety as though fully and completely set forth herein.

FIELD OF THE INVENTION

The present invention relates to the field of equipment parts such as automobile parts, and more particularly to a system and method for providing repair data for parts.

DESCRIPTION OF THE RELATED ART

A complex mechanism like an automobile/light truck comprises thousands of integrated but discrete types of parts. There are tens of thousands of different year, make and model automobiles/light trucks on the road. Each automobile/light truck can share certain common classes of types of parts (often referred to as part types) with other automobiles/light trucks while also being constructed with types of parts unique to the specific automobile/light truck manufacturer. The automobile/light truck is also further defined by specific options and manufacturing variables which were used to build the vehicle.

When an automobile/light truck is being evaluated for a problem condition, a catalog list of available SKU numbers (SKUs) for the vehicle can be generated. This list of SKUs may be cross linked to the discrete set of instructions and data needed to inspect, repair, and/or replace the part. One problem with current methods is the complexity of matching the SKUs required to repair a vehicle to the myriad number of operations, tasks, specifications, and other information.

The size and variety of data generated by the original vehicle manufacturers is one obstacle which is desirable to overcome in the repair process. The lack of standards within the automobile industry is another problem. Repairing an automobile/light truck combines data from multiple industry sources. These sources use their own set of definitions and descriptive terms to name parts, repair activities, and associated information. The lack of consistency in preparing parts' catalogs, inventory profiles and repair activities flows across all industry segments adding complexity to the repair process. Thus, improvements in information retrieval would be desirable.

SUMMARY OF THE INVENTION

Various embodiments of the present invention relate to providing repair information for a part, e.g., an automobile part. The system may comprise one or more server computer systems coupled through a network, such as the Internet. The one or more server computers may be accessible by a client computer over the network.

More specifically, a website may be provided which includes part information for display. The part information may include a plurality of possible vehicles and/or a plurality of possible parts. As indicated above, the website may be generally directed towards the parts and repairs of vehicles, e.g., automobiles, light trucks, all-terrain vehicles, etc.; however, the descriptions herein may equally apply to other industries or markets where parts are involved, e.g., audio/video components, appliances, furniture, as well as many other markets/industries. Thus, part information may be displayed on a website for a user, e.g., a mechanic who wishes to retrieve information regarding parts for automobile repair.

User input may be received, e.g., to the website, specifying a vehicle from the plurality of possible vehicles as well as a part of the plurality of possible parts. Alternatively, or additionally, input may simply be received specifying a vehicle and/or a vehicle system. Upon receiving the input, the website, e.g., using one or more servers which provide information for the parts/vehicles, may display information regarding the specific parts/vehicle chosen by the user. Alternatively, user input may be received specifying part information, e.g., the specific part, an SKU of the part, a type of part, etc. The method may retrieve a normalized part type based on the selected part. For example, the method may retrieve and display information from a rules engine, e.g., stored on a coupled one or more servers, which may provide the normalized part type. More specifically, the rules engine may identify a specific water pump as being a normalized part type "water pump". Similarly, other normalized part types may apply to other parts. Thus, the rules engine may normalize specific part names with the type of the part.

The method may further include receiving further input from the user (e.g., via the website) to view repair information associated with the part, e.g., associated with the vehicle. This input, and those above, may be received via a variety of methods, e.g., using a graphical user interface of the website, and/or by simply allowing the user to type queries and return results (among other methods). For example, the website may include a GUI element that indicates repair information, and the user may supply the input to view the repair information by providing input to the GUI element, e.g., by selecting the element. More specifically, the user may be able to simply click a button on the website to request the repair information regarding the part. Where a plurality of repairs or jobs is associated with the part, the website may display a plurality of jobs for the user to select from, e.g., to retrieve the labor costs associated with the repair(s) or job(s). The repair information may include a plurality of jobs associated with the part, labor cost information (e.g., the flat rate information associated with one or more jobs of that part), technical bulletins (e.g., associated with the vehicle, vehicle system, and/or the part), recall information (e.g., associated with the vehicle, vehicle system, and/or the part), etc.

Correspondingly, the website may automatically provide the repair information associated with the part information (or selected job), vehicle, and/or vehicle system for display in response to the user input to view the labor cost information. As indicated above, the repair information may include labor information such as labor flat rate information, e.g., how much time the user may charge for the job associated with the part. For example, if the user selects a specific water pump, the website may provide labor information which includes the flat rate for the water pump replacement, e.g., 1.2 hours.

The website may automatically provide the repair information by accessing a repair database, e.g., via the rules engine, to obtain the repair information. As indicated above, the method may retrieve various information regarding the vehicle and parts, e.g., the labor cost information from other servers. For example, the method may retrieve the cost information from the rules engine which is stored on a repair server, among other servers. Similar to above, the rules engine may store associations between vehicles, parts, and associated repair information, e.g., normalized part types, and the vehicles, e.g., for repair or replacement of the parts in the vehicle.

Automatically providing the repair information may be performed without further user input specifying the part and/or entry into another website. Alternatively, or additionally, automatically providing the repair information may include automatically providing a second website comprising the repair information, e.g., which may also not require user input specifying or the second website. Automatically providing the repair information, e.g., using either the first or the second websites, among other methods, may not require the user to re-specify or provide the vehicle or the part previously given to the website. Thus, automatically providing the repair information may occur without any re-specification of previously provided information. In some embodiments, the labor cost may be provided without any or at least minimal additional input from the user.

Thus, repair information may be provided to the user in response to selection of parts and vehicle information.

BRIEF DESCRIPTION OF THE DRAWINGS

A better understanding of the present invention can be obtained when the following detailed description of the preferred embodiment is considered in conjunction with the following drawings, in which:

FIGS. 6-16 are an exemplary set of websites according to one embodiment.

Figure 1:
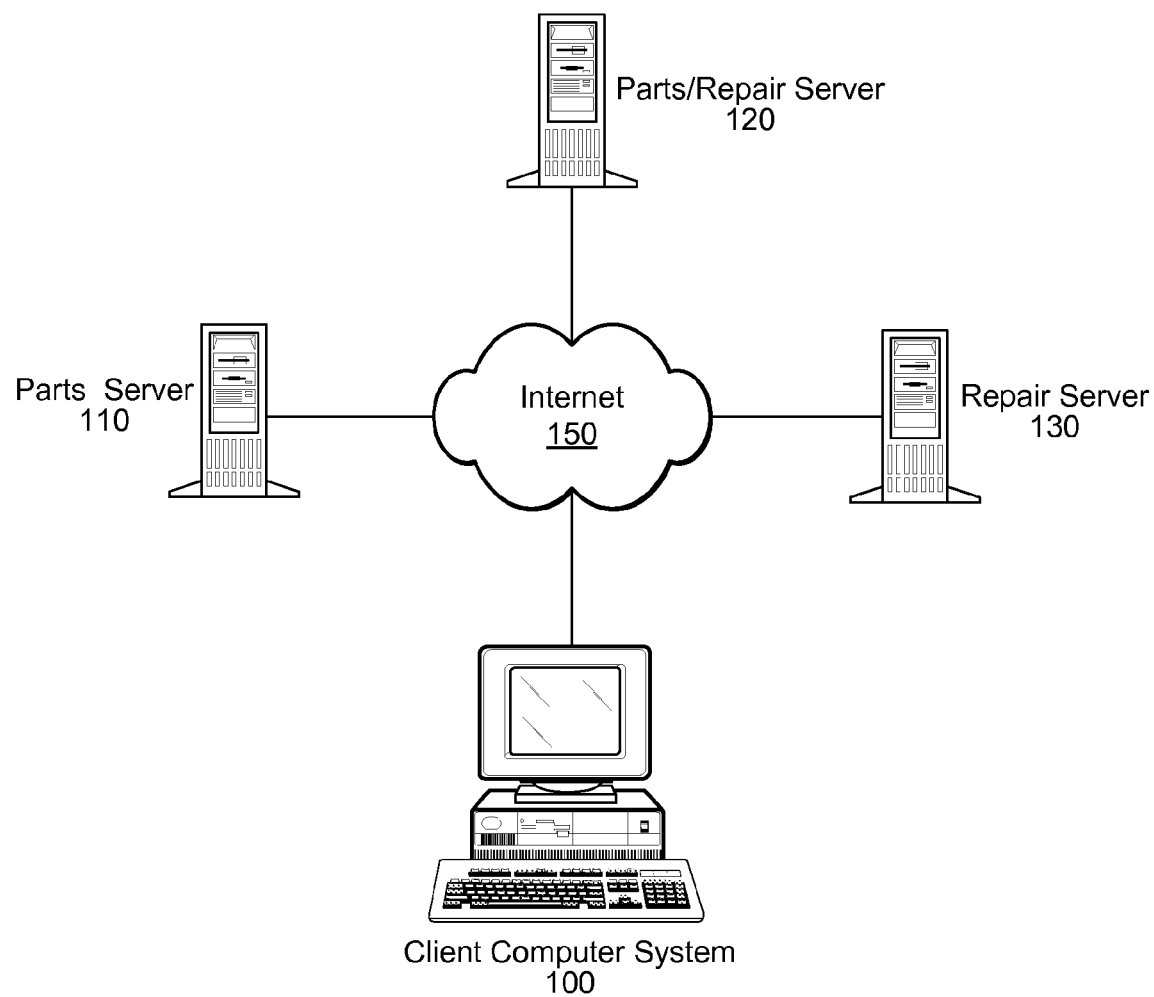
FIG. 1 illustrates one embodiment of a system for implementing various embodiments of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

Graphical User Interface Element—an element of a graphical user interface, such as for providing input or displaying output. Exemplary graphical user interface elements comprise input controls and output indicators.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

FIG. 1—Exemplary Computer Network

FIG. 1 illustrates one embodiment of a system operable to implement various embodiments of the current invention. Note that various ones of the components/servers illustrated in FIG. 1 (or others) may be omitted or added as desired. As shown, a client computer system 100 which may be operated by an end user may be coupled to the Internet 150. The user may interact with various computer servers which may be able to conjunctively provide repair information of a part via the Internet.

In some embodiments, the servers may include a parts server 110, a parts/repair server 120, and/or a repair server 130, which will be described in more detail below. Note that the servers described above may be distributed over a plurality of servers, such as, for example, the three servers illustrated in FIG. 1, among other possible distributions; however, in some embodiments, various of the servers or components may be included in a more centralized system, e.g., on a single server or a lesser number of servers, or in some embodiments a greater number of servers. In other words, the systems and computer systems illustrated in FIG. 1 may be distributed in any appropriate fashion and are not limited to the configurations illustrated in FIG. 1 or described herein.

For example, in some embodiments, repair server 130 may be included in one or more of the parts server 110, the parts/repair server 120, and/or the client computer system 100. More specifically, the repair server 130 may be implemented on one or more of the computer systems that may implement embodiments of the present invention, e.g., over a network or installed from a memory medium such as a CD or DVD. Additionally, it should be noted that various of the other systems, e.g., the parts database, may be installed on any of the other computer systems/servers as well. Thus, the servers shown in FIG. 1 may be distributed in any appropriate manner.

In addition, the system may comprise a plurality of parts servers 110 and/or a plurality of repair servers 120, among other configurations. For example, the system may comprise at least one parts server 110 for each car manufacturer and/or at least one repair server 130 for each car manufacturer.

The various servers, such as the parts server 110 and/or repair server 130 may themselves receive periodic database and/or software updates from other computer systems (not shown). Thus, for example, the part database in parts server 110 may be updated periodically with new parts information, as needed. Similarly, the repair database in the repair server 130 may be updated periodically with new repair information (e.g., flat rate information), as needed.

The parts server 110 may be operable to provide information regarding various parts. In particular, the parts server 110 may include a parts database which may store information regarding a plurality of parts, e.g., automobile parts. The repair server 130 may be operable to provide information regarding various repair job and/or labor cost or rate information. In particular, the repair server 130 may include a repair database which may store information regarding repair costs or rates for installing or repairing parts, e.g., automobile parts.

Note that while many embodiments are described herein with regard to automobile parts, the descriptions provided may also apply to parts in other industries, e.g., furniture parts, electronic components and/or adapters, home repair items and/or fixtures, pool/spa repair, or any other types of industries that include parts or repair/labor costs. In some embodiments, the parts server 100 may provide an interface to retrieve the information regarding specific parts, e.g., as specified by a user, e.g., to a website on the Internet 150. Thus, the parts server 110 may store information regarding a plurality of parts and provide information regarding one or more of those parts.

The repair server 130 may provide information regarding the labor required to install or repair various parts, e.g., from the plurality of parts of which the parts server 110 stores information. For example, the repair server 130 may store information regarding the flat rates associated with installing automobile parts. As used herein, the term "flat rates" is intended to include the ordinary meaning of "flat rates" used in the automobile industry as well as the descriptions provided herein. For example, a flat rate may include the normal amount of time, or alternatively, the amount of time that would be charged under warranty, that is required to install the part in question. In one embodiment, the repair server 130 may be operable to provide repair information regarding a specific automobile installation task, e.g., with respect to a particular vehicle.

As a specific example, the repair server may include a database which stores information regarding the installation of, for example, a water pump in a 2001 Toyota Corolla. Following this example, the database on the repair server 130 may indicate that the flat rate for this installation is 1.2 hours. Thus, the repair server 130 may be operable to provide labor information based on previously selected part/vehicle information. As indicated above, the repair server 130 may be included on one or more of the other servers/computer systems. In some embodiments, a database holding the labor information may be installed on any one or more of these systems and may be accessed using any suitable means for retrieving information from a database, e.g., using queries or other methods.

The parts/repair server 120 may be operable to integrate the information provided and/or stored in the parts server 110 and the repair server 130. In some embodiments, the parts/repair server 110 may host a website that is accessible by the client computer system 100, e.g., for requesting and retrieving integrated information regarding parts and/or repair information. Alternatively, the user may interact with a website server that stores the website. In this embodiment, the website server may provide an interface between the parts/labor server 120 (and/or the other servers) and the client computer system 100. In some embodiments, the parts/repair server (or any one or more of the servers) may include a rules engine (e.g., database) which may link the information provided by the repair server, the parts server, the client, and/or the part/repair server, among other sources. More specifically, the rules engine may be used to retrieve repair information based on specified parts and/or vehicles. Thus, according to various embodiments, a user may use the client computer system to request and receive repair information from a website via the Internet 150.

Figure 2:
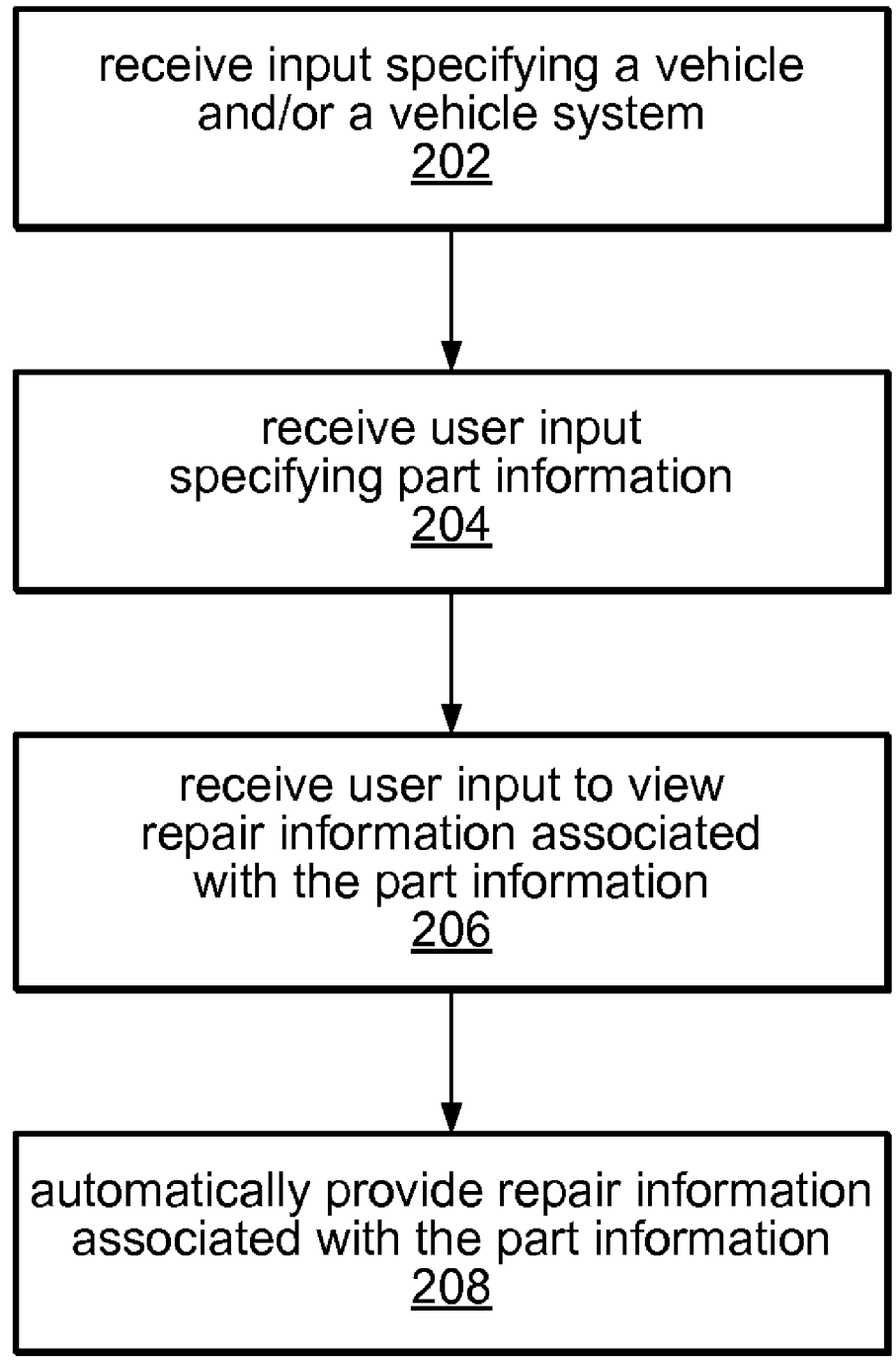
FIGS. 2-5 are flowcharts illustrating an exemplary method for providing repair information for a part according to one embodiment.

FIG. 2—Exemplary Method for Providing Repair Information for a Part

FIG. 2 is a flowchart illustrating an exemplary method for providing repair information for a part, e.g., an automobile part. The method shown in FIG. 2 may be used in conjunction with any of the systems or devices shown in the Figures herein, among other systems. Additionally, any of the methods/descriptions provided in the flowcharts below may also apply to the method of FIG. 2. In various embodiments, some of the method elements shown may be performed concurrently, in a different order than shown, or may be omitted. Additional method elements may also be performed as desired. Additionally, note that while embodiments described below relate to a website, the method may be performed as a stand alone application. Furthermore, the website may refer to one or more websites acting cooperatively, as desired. As shown, this method may operate as follows.

In 202, input specifying a vehicle and/or a vehicle system may be received, e.g., to a website hosted on one or more of the server described above. In some embodiments, the website may be provided to the client computer over the Internet, and may include a list or set of options related to vehicles, vehicle systems, and/or parts (e.g., specific parts or part types). Thus, in some embodiments, a user may provide input specifying a vehicle and/or vehicle system to the website, e.g., using the computer system 100. As indicated above, the website may be hosted on a web server, and/or one or more of the parts server 110, the labor server 130, and/or the parts/labor server 120, among others. The website may include various graphical displays/layouts that may be presented to the user on a display of the computer system 100. In some embodiments, the various graphical displays/layouts or GUIs may allow the user to select a vehicle and/or part. Thus, according to some embodiments, the user may visit a website which includes information for a plurality of vehicles and/or possible parts, e.g., for the plurality of vehicles.

In other words, the user may choose a vehicle and/or vehicle system, e.g., using various methods. For example, the user may provide input to a website which may present a graphical user interface for allowing the user to specify the vehicle, e.g., that must be repaired. In one embodiment, the user may select a manufacturer from a drop down list. Upon choosing the manufacturer, the first website may display a list of models, e.g., in another drop down list. Similarly, the user may choose a model, make, and year of manufacture to specify a specific vehicle, e.g., an automobile or light truck. Alternatively, the user may similarly specify a vehicle system. As used herein, a vehicle system is used to refer to a portion of a vehicle. For example, an engine is an example of a vehicle system. Vehicle systems may have one or more associated attributes (e.g., cylinders, size, year, make, etc.) Note that the above descriptions regarding the drop down lists are exemplary only, and that other methods for specifying the vehicle and/or vehicle system are envisioned. For example, the user may be able to select the vehicle using other GUIs, e.g., using pop up information windows, radio buttons, descriptions, etc.

In some embodiments, the user may be able to type in a key phrase that represents the class of vehicle/vehicle system or the specific vehicle/vehicle system itself. Correspondingly, the method may identify the class or vehicle/vehicle system using the key phrase; however, in some embodiments, the website may present the user with a list of matches for the key phrase and the user may be able to select the specific class or vehicle from the list. Thus, the user may be able to specify a vehicle or vehicle system via various methods, such as those described above, among others. However, these methods are exemplary only, and other embodiments are envisioned. For example, in one embodiment, a mechanic may have a customer's vehicle (or vehicle profile) already stored, and that information may be provided without any user input (other than, perhaps, the user selecting the appropriate vehicle profile for the customer).

In one embodiment, upon receiving specification of the vehicle and/or vehicle system, the method may allow the user to specify one or more parts (or part types) that the user is interested which relate to the specified vehicle, e.g., using the rules engine. More specifically, the website may display a graphical user interface which shows various parts that are associated with the specified vehicle. Following the descriptions above, the website may interact with parts server 110, e.g., a parts database stored on the parts server 110 to retrieve this information. Alternatively, where the website may send information regarding the specified vehicle to the parts/repair server 120, which may in turn retrieve the desired information from the parts server 110. Following this embodiment, the parts server 110, may send the resulting information to the website for display to the user. Thus, according to various embodiments, the website may receive part information regarding the specified vehicle/vehicle system from the parts server 110 and display at least a subset of that information to the user.

In 206, user input specifying part information may be received. The part information may include a specific part (e.g., identified by a stock keeping unit (SKU)), information regarding the specific part (e.g., the part type of the specific part, information regarding which vehicles the specific part applies to, and/or other information), a part type (e.g., water pump, spark plug, etc.), and/or other information related to a part. Similar to above, the user may specify the part information via various methods, e.g., via key phrases, or various graphical user interface elements. For example, in one embodiment, the website may display an expandable tree that allows the user to expand various types of parts and then select an individual part from the tree. In some embodiments, the parts may organized according to part groups, e.g., cooling parts, engine parts, wheel parts, etc., types of parts, e.g., water pumps, tires, engines, etc., and specific parts. Note that the above groupings are exemplary only and other organizations are envisioned. In one embodiment, each part may include further auxiliary information related to the part as a description. For example, each part listing may have a description to the side of the part, or the user may be able to click on the part to receive more information, e.g., via a pop up window. In some embodiments, the user may select more than one part; following the descriptions above, information regarding the parts may be similarly retrieved, e.g., from the parts server 110, among other sources. Thus, the user may specify part information, e.g., using the website.

Where the part information includes specification of a specific part(s), the method may include displaying the selected parts in a listing, e.g., with a description besides each part. In some embodiments, the listing may be provided via the website.

In 206, user input to view repair information associated with the part information may be received, and, in 208, the repair information may be automatically provided. In some embodiments, the website may display a "repair" button next to the part(s) (e.g., in the listing), among other methods for user input, which may allow the user to request repair information. The repair information may be associated with the part information, the vehicle, and/or the vehicle system. For example, the repair information may include service bulletins associated with the vehicle, vehicle system, and/or part information. As a specific example, the service bulletins may indicate that the vehicle being repaired has a brake issue and should be serviced.

The repair information may include a listing/description of one or more jobs associated with the part information; for example, where the part information includes a specific part, e.g., a specific water pump, the repair information may include one or more jobs associated with the part type (e.g., replacing the water pump). Thus, in some embodiments, the part type may be determined based on the specific part (e.g., using descriptions associated with the specific part or via queries in the database of the servers described above), and one or more jobs associated with the specific part may be displayed. Correspondingly, the repair information may also include labor information and/or repair procedures associated with each of the one or more jobs. The labor information and/or repair procedures may be specific to the specified vehicle, vehicle system, and/or part information. For example, in one embodiment, a request to receive repair information may result in the method (e.g., the website) displaying the flat rates associated with the installation, repair, or other job associated with the part information, e.g., using the rules engine.

More specifically, in one embodiment, when the user requests repair information, the method (e.g., the website) may ask the user to select a job associated with the specified part information received in 204. For example, if the user selected a particular water pump (or the water pump part type), the website and/or the parts/labor server 120 may retrieve repair information associated with the particular water pump and the specified vehicle to provide a list of jobs that might be associated with the water pump and the vehicle, e.g., installation of a water pump, repair of a water pump, etc. Correspondingly, once the user has selected a job, repair information may be retrieved (e.g., using the website or servers described herein) for the job (e.g., an estimated labor cost from the labor server 130, e.g., using a database stored on the labor server 130). In some embodiments, where there is only one job associated with a particular part and vehicle, the labor costs may be retrieved automatically, e.g., without the user selecting the job. In other words, if there is one job, the job may be selected without user input.

Correspondingly, the repair information associated with the vehicle, vehicle system, part information, and/or selected job may be automatically displayed in response to the user input to view the repair information. In preferred embodiments, the user may not specify a different website for this to occur. In other words, the user may simply request the repair information after having selected the vehicle and part in 204 and 206 and receive the repair information without any other input other than requesting the labor costs. Said another way, the user may not have to re-specify the vehicle, part, or any other information to receive the labor costs associated with the part, the vehicle, and/or the jobs regarding the part and/or the vehicle.

In some embodiments, after selection of a specific job (or one or more jobs), one or more correlated activities may be displayed. Alternatively, the one or more jobs provided in the repair information may include the one or more correlated activities. Correlated activities may refer to other repair jobs that can be performed at the same time as the selected repair job. For example, where the repair job is replacement of a water pump, a correlated activity may include replacement of the thermostat of the water pump. Further examples are provided below.

Additionally, after selection of the specific job(s), the method may include providing one or more part type associated the at least one selected job. Correspondingly, the user may select at least one part type of the one or more associated part types, and specific parts of the part type may be provided for the user to purchase. For example, where the part information includes a specific spark plug, and the repair job is replacement of the spark plug, an associated part type may include spark plug wires. Correspondingly, the user view a list of specific spark plug wires and select one of the spark plug wires for purchase.

A more specific example using the systems and methods herein is described in more detail below with regard to FIGS. 5-16.

Figure 3:
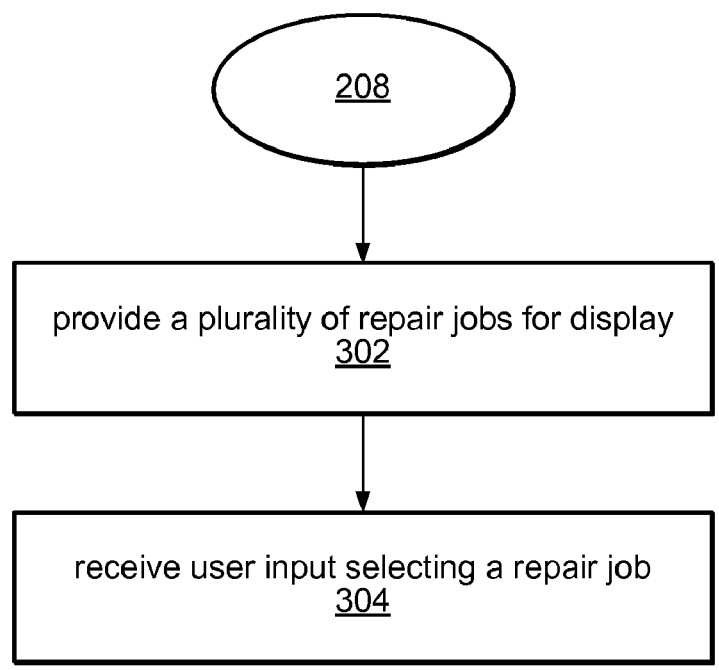

FIG. 3 provides a more specific method of the method element 208. More specifically, receiving user input to view lab or costs associated with the specified part may include the website providing a plurality of repair jobs for display in 302. In one embodiment, if the user selects a part that has many possible jobs associated with it, the website will ask the user to select the repair that the user is going to perform in 304. For example, if the user selects a water pump, various jobs concerning the replacement of the water pump and replacement of various connecting hoses associated with the water pump may be displayed for the user's selection. In some embodiments, the jobs may include jobs associated with the primary job and/or the specific vehicle. For example, the user may choose to repair all of the hoses as well as the water pump and/or to replace the tires in the car due to a manufacturer's recall, among other possible jobs. Thus, the user may choose from a plurality of repair jobs to receive labor information. Note that in some embodiments, where there is only one repair job, the website may not display the repair job and may instead automatically provide the labor costs.

Figure 4:
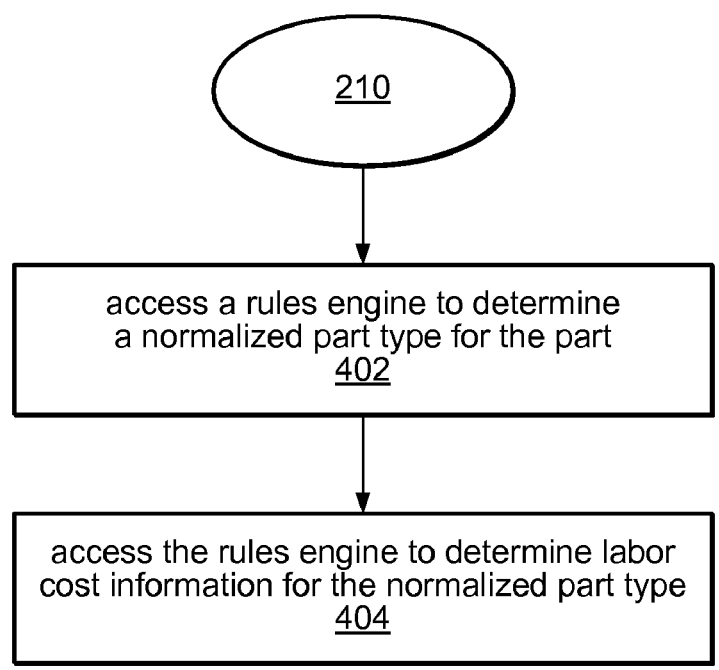

FIG. 4 provides a more specific method of the method element 210. More specifically, automatically providing labor costs associated with the specified part for display without the user re-specifying the part (and/or the vehicle/another website) may include, in 402, accessing the rules engine to determine a normalized part type for the specified part. In many cases, it may not be clear what type of part the specified part name is based on just the part name. For example, the name "iron 3 piece kit" does not indicate that the part is actually one timing chain, one camshaft gear, and one crankshaft gear. Correspondingly, the rules engine may operate to convert the specific part name to a normalized part type which allows for identification of the part based on its category, e.g., such that other repair information be retrieved using the normalized type. Thus, the iron 3 piece kit may be identified as a timing and gear part. It should be noted that the normalized part type may be determined, e.g., using the rules engine, in any of various points throughout the method and is not limited to the method element 210. Thus, in some embodiments, the normalized part type may be determined right after the part specification, or before provision of labor costs, among other times.

In 404, the rules engine may be accessed to determine labor cost information for the normalized part type. More specifically, the rules engine may receive, as input, the normalized part type and use that normalized part to identify labor information of that type of part, e.g., for the specified vehicle. As indicated above, in some embodiments, this process may be performed on various servers, e.g., ones that store the rules engine, and the labor costs may also be retrieved from one or more of the servers, e.g., the labor server 130. Thus, a rules engine (e.g., database) may be used to determine a normalized part and/or provide labor cost information for the specified part.

Figure 5:
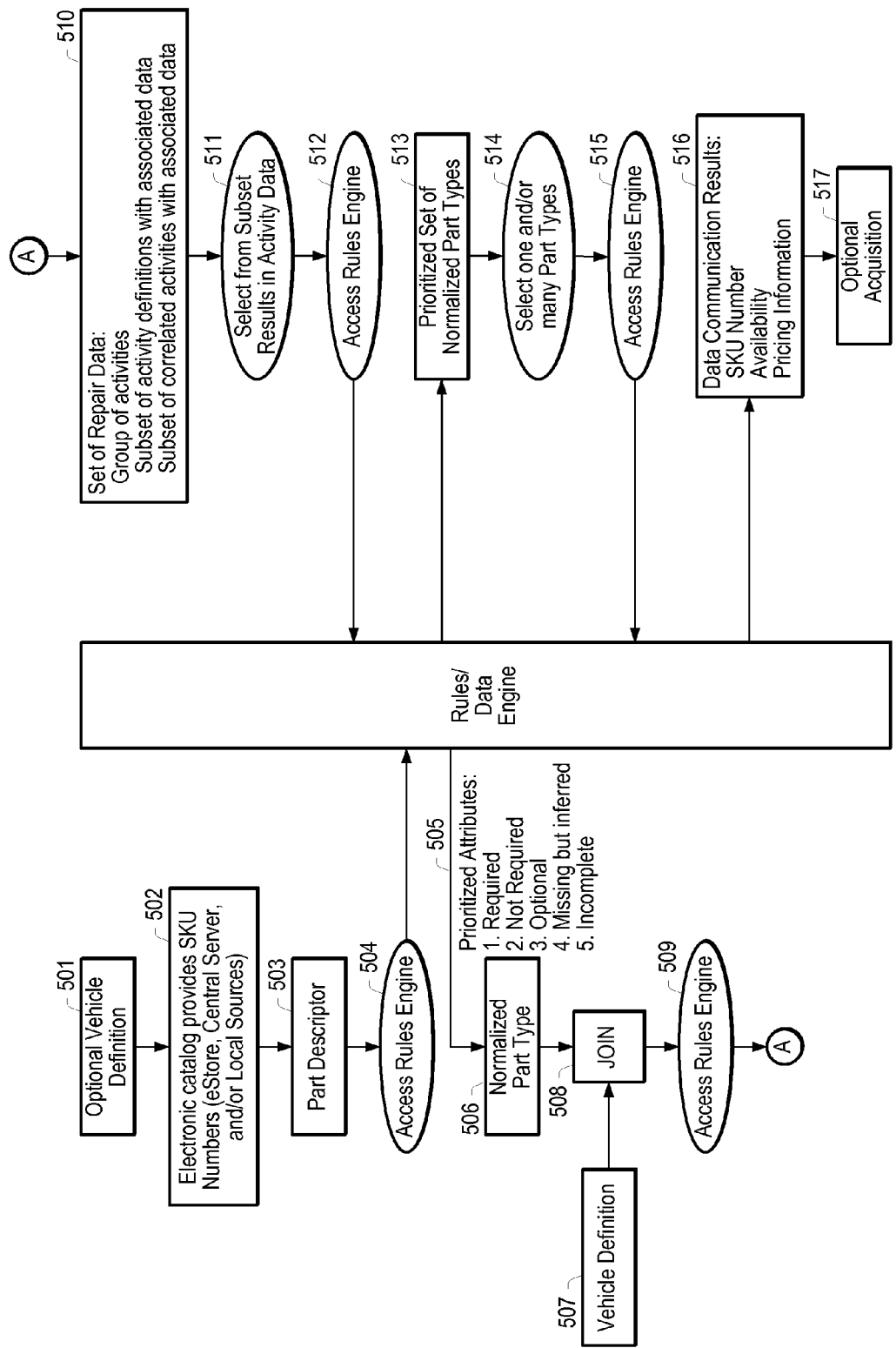

FIG. 5—Exemplary Flowchart for Providing Repair Information

FIG. 5 is an exemplary flowchart which illustrates a method for providing repair information to a user. Similar to above, the method shown in FIG. 5 may be used in conjunction with any of the systems or devices shown in the above Figures, among other systems. In various embodiments, some of the elements shown may be performed concurrently, in a different order than shown, or may be omitted. Additional elements may also be performed as desired. Additionally, it should be noted that the descriptions below are exemplary only and are not intended to limit the invention. As shown, this method may operate as follows.

At 501, an optional vehicle definition may be created, which may refer to the definition of a vehicle. An optional vehicle definition may be created by input relating to a specific vehicle. The vehicle may typically be defined by all or a portion of the following data elements: make, model, submodel, year, and engine. If the vehicle is provided, an electronic catalog may be utilized. Otherwise, a selection may be made from specific parts, e.g., based on SKU numbers or out of various catalogs or lists, a list of types of parts, e.g., normalized part types, or descriptions of types of parts (or normalized part type descriptions), among others.

At 502, an electronic catalog (or other type of service/server) may provide SKU Numbers (eStore, Central Server, and/or Local Sources, among others)—An electronic catalog may be used from an eStore (wherein SKUs may be ordered from suppliers), a central catalog server which can be used by multiple users, or by a catalog which is resident on a standalone computer, among other possibilities. If a vehicle is defined, the catalog may return a list of one or more SKU numbers that represent specific parts that may be used in the repair of the vehicle. These SKUs may have information associated with them that further defines the type of part represented by the SKU and the specific conditions under which the SKU should be utilized.

503 is a part descriptor which may be provided with the SKUs as indicated above, and may be provided to the Access Rules/data Engine in 504. The information provided with a SKU may provide a description of the type of part represented by the SKU number. However, this part Descriptor may vary greatly in form from supplier to supplier. It may be very difficult to compare descriptors between suppliers and even to compare descriptors within a display of a group of SKUs. The access rules/data engine may be a rules-based engine which provides the data analysis, comparison mapping, grouping, and selection targeting to deliver back to the process a normalized part type.

In 505, prioritized attributes may be provided, e.g., with the normalized part type from the access rules/data engine. In one embodiment, the normalized part type may be accompanied by the prioritized list of attributes. This list may further describe and define the normalized part type. These attributes may be "required", "not required", "optional", "missing but inferred", or "incomplete", among others.

506 is the normalized part type which may result from the access rules/data engine, e.g., using the part descriptor of the specified part. This normalized part type may be designed to be consistent across all Suppliers of Terminologies. It may be a well-defined data element which can be used to establish a relationship with various types of repair data.

507 is the vehicle definition, e.g., a definition of the specific vehicle to be used. This may be provided during various points in the method, e.g., at 501 or at other point(s) in the process. If it was not entered at step 1, then it must be provided at this point. It should be noted that in many instances the Rules/data engine must map the vehicle definition provided to a different vehicle format in order to gain consistency between different data suppliers.

In 508, the normalized part type may be joined with the vehicle definition in order to define the desired input to the rules/data engine. Correspondingly, in 509 the rules/data engine may be used in order to obtain a set of repair data, e.g., provided in 510. The set of repair data may be repair data meeting the criteria obtained from the join and may be provided by the rules/data engine. This data may be usually organized as a "group of activities", each of which may be further defined by a "subset of activity definitions", e.g., with associated data. A specific activity may be accompanied by a "subset of correlated activities", e.g., each with associated data. This data may be specific to work that may be done with respect to a given vehicle.

In 511, subset results may be selected. In one embodiment, the user may select from the group of activities, the subset of activity definitions, and/or possibly from the subset of correlated activities, among others. In 512, the rules/data engine may be accessed to return a prioritized set of normalized part type, e.g., in 513. More specifically, the rules/data engine may utilize the selections made in 511 to provide a set of normalized part types, which may be related closely to the selected activities, e.g., jobs or repairs. The prioritized set of normalized part types may be a direct result of the activities which were defined and selected in 510/511. They may be prioritized in the order that they are likely to be selected by the user.

In 514, the user may select one or more any part types, e.g., that the user wants to convert to SKUs, e.g., from the data source/catalogs described above, with associated data. In 515, the rules/data engine may be accessed to provide data communication results, e.g., in 516 and possibly including SKU number, availability, and/or pricing information, among others. The SKUs provided in 515 may be used in order to obtain parts availability and pricing. This data may be obtained from an eStore, by communication with a central server, or by communicating with individual inventory locations, among other methods. In 517, the user may place orders for selected SKUs.

Detailed Description of FIG. 5

Similar to above, the following descriptions are exemplary only and are not intended to limit the invention.

FIG. 5 is a block diagram of the process required of an individual or computerized system wherein the desired outcome may be to move from the creation of one or more descriptions of a part (either SKU number or a written part description related to the type of part being selected) to the determination of "activities information" (511), information regarding SKU numbers (516), and the possible acquisition of SKU numbers (517). In steps 501 and 502 an electronic parts catalogue may be used to determine a list of SKU numbers that meet some pre-determined criteria. For example, all Timing Chains/Belts and Kits that are used on a 1996 Dodge Dakota may be listed by an eStore using the Internet to communicate with a central server farm and various supplier inventory locations. The next step may be to determine a specific SKU's description (503). This description may be designed as a "descriptor." The descriptor may be operated on by a rules based engine, which may be operable to generate a normalized part type (506), which may or may not have various types of attributes assigned to the type (505). For example, a descriptor of an "Iron 3 Piece Kit" could result in a normalized part type of "timing gears and chain kit." The attributes of this normalized part type may be that it is comprised of one timing chain, one camshaft gear, and one crankshaft gear. It should be noted that in this case the three attributes of the normalized part type are themselves normalized part types, but this is not required. In fact, it is not required that there be attributes for the normalized part type.

In 508, the previously specified vehicle may be joined with the normalized part type (506) and operated on by the rules based engine. This operation may result in a group of activities (510), each of which may be further defined by a subset of activity definitions and a subset of correlated activities. When the 1996 Dodge Dakota is joined with the normalized part type, "Timing Gears and Chain Kit", which had specific attributes of containing one timing chain, one camshaft gear, and one crankshaft gear, the resulting group of activities may be:

Replace Camshaft Gear
Replace Crankshaft Gear
Replace Timing Chain

It may often be the case that there is only one activity in this Group. In this example, one of the elements contained in this Group of Activities may be selected. This results in the possible generation of two subsets: the subset of activity definitions and the subset of correlated activities. For example, if the third activity is selected the following subsets may result.

| | |
|---|---|
| Replace Timing Chain | (Activity) |
| 2.5 L Engine | (Activity Definition) |
| 3.9 L Engine | (Activity Definition) |
| 5.2 L Engine | (Activity Definition) |

With a subset of correlated activities of

| | |
|---|---|
| Replace Camshaft Gear | (Correlated Activity) |
| Replace Crankshaft Gear | (Correlated Activity) |
| Replace Timing Chain Tensioner, if 2.5 L Engine | (Correlated Activity) |

Information may be provided for one or more of the activity definitions and correlated activities (511). Additional information may be provided for the selected Activity. In this example, the time required to complete the activity, the time specified for a warranty claim to the manufacturer, and the skill level of the technician required to perform the work may begiven for each activity definition and for each of the correlated activities. In addition, there may be additional times required to perform the work for the selected activity, if certain conditions exist. For example, the amount of additional time required to complete the work if the air conditioner interferes with the work may also be provided. In the automotive repair industry these "times" are often referred to as "labor flat rates" as described above.

The selection of an activity, one or more activity definitions, and possible correlated activities may result in the presentation of a prioritized set of normalized part types that may be required to perform the various activities and normalized part types that may be required to perform related work (513). In the example, this may include "timing chains and gear kits", "timing adjusting shoes", "timing chain guides", and/or "timing chain tensioners" (514). The selection of one or more of these normalized part types may result in the return of the process to the eStore in order to determine the availability and prices for these items (515 and 516). An optional step in the process would allow the ordering of some of the resulting SKU numbers (517). This process allows for the selective movement between 502-509, 510-516, and the repeating of the process until all required information has been determined. Optionally, this repeated process may result in the acquisition of one or many SKU numbers/parts (517).

It should be noted that there is nothing that limits the type of activities that may be included in the resulting "group of activities" returned in 508. The work definitions and labor flat rates may just as easily have been manufacturer recall notices, manufacturer technical serve bulletins, automobile or truck subsystem parts explosions (pictures or diagrams), wiring diagrams, or other data related to the repair of an automobile or light truck.

FIGS. 6A-16—Exemplary Websites

FIGS. 6-16 are an exemplary set of websites which illustrate a sample interaction where a user may receive repair information. The design, implementation, example data, and any other information shown or described are exemplary only and are not intended to limit the invention. In particular, these Figures illustrate one exemplary embodiment and other embodiments are envisioned.

FIGS. 6A-6D illustrate exemplary selection screens usable to provide vehicle information. As shown in 6A, the user may select the year of manufacture for a vehicle. In 6B, the user may choose a make available for the selected year (in this case 1998 from 6A). In 6C, (after choosing a ford in 6B), the user may select a model. In 6D, the user may select the specific vehicle engine for the selected 1998 Ford Taurus. Thus, FIGS. 6A-6D allow for specification of a specific vehicle.

FIG. 7 is an exemplary website which allows the user to select a category and/or general type of the desired part. As shown, the user may select a choice from the set of check boxes in the provided list (labeled 1-59 in the body of FIG. 7), and/or use other selection methods. In this particular example, the user has selected the check box from the quick list for the timing chains/belts, kits, and cover sets category.

FIG. 8 illustrates an exemplary parts list which may be displayed following the selections by the user using, for example, the website shown in FIGS. 6 and 7. As shown, the parts may be displayed according to the distributor/manufacturer, e.g., Cloyes Gear & Product, Inc., Sealed Power, etc. Each part may include a status of the part, a description, a stock keeping unit (SKU)/part number, year information (e.g., for which years the part is valid), warranty information, list price, cost price, extended price, and stocking information, e.g., whether the part is located in a local store, the network, or if the part is at the distribution center. Additionally, the user may specify whether to order the part, e.g., using the order checkbox, the quantity of the part, and whether the order is urgent, among other choices. In some embodiments, the user may choose to view labor information using the "L" button, check for part availability using the check availability button, and/or view more information about the part using the inquire arrow button.

Figure 9:
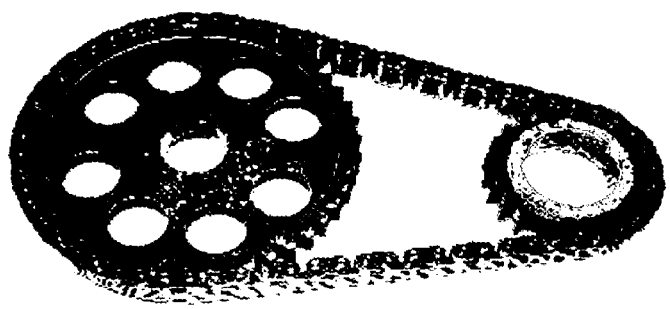

FIG. 9 illustrates an exemplary further information window, e.g., a "pop-up" window, which may be provided when the user selects the part. In this example, the user has selected the "Iron 3 Piece Kit" shown in FIGS. 8 and 9. As shown, the further information website may provide cross references, e.g., original equipment (OE) numbers and manufacturers. Additionally, the window may display related documents, or provide links corresponding to related documents. Additionally, other external links may be provided, e.g., contact us and about us, which may be used to contact or retrieve information about the manufacturer and/or part provider, as well as a print button for printing the further information window. As shown, the further information window may include a picture of the part as well as the part number and manufacturer. In some embodiments, the part may be relabeled according to its normalized part type. As indicated above, a database, e.g., the rules/data engine, may provide the normalized part to be displayed on the website, such as, for example, the further information window, based on the part name, user information (e.g., previous or current information about the part that may be provided, e.g., by the user), part description information, and/or other information. Thus, in this example, the normalized part name for the Iron 3 Piece Kit is Timing Gears & Chain Kit (Timing Pts).

Figure 10:
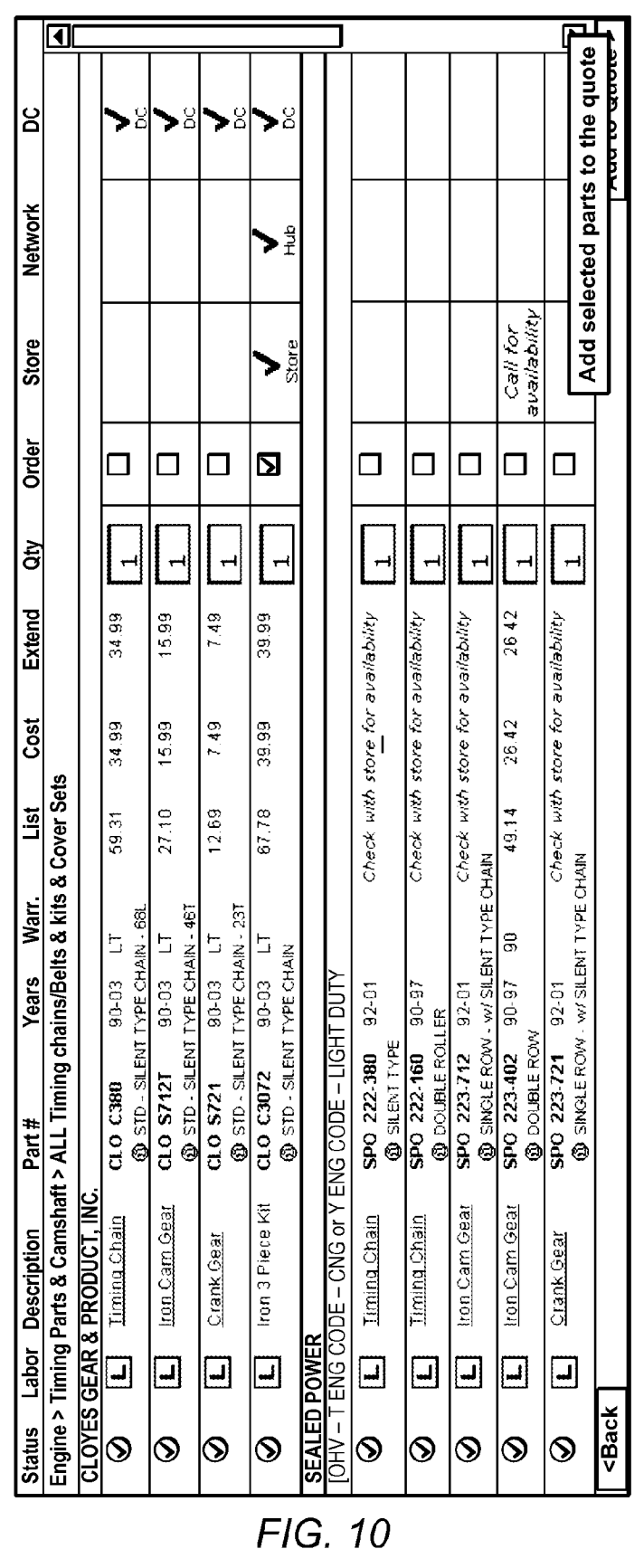

FIG. 10 is an exemplary website similar to FIG. 8 where the user has "checked", e.g., via clicking or other selection, to order the Iron 3 Piece Kit for the specified vehicle. Additionally, the website includes a information pop-up which may be displayed when the user moves the mouse over the "add to quote" button. In other words, the website may include the window as a mouse-over behavior for the "add to quote" button of the website. In this example, the information pop-up may provide more information about the specific button, e.g. that this button is used to "add selected parts to quote". Thus, the user may select parts and add them to a quote, e.g., a repair quote.

Figure 11:
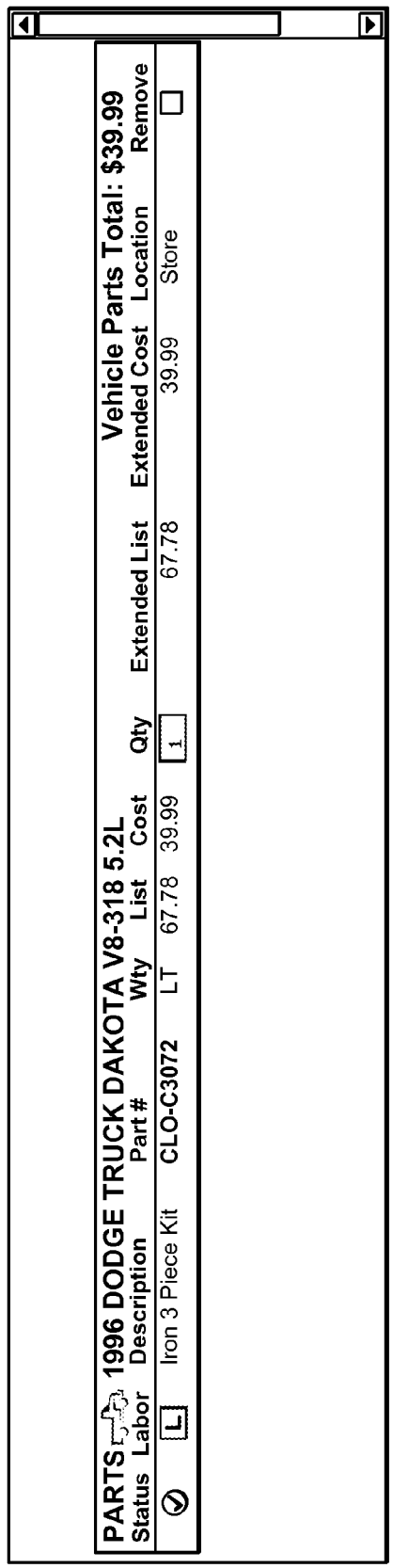

FIG. 11 is an exemplary website which shows the resulting quote from the users selections in FIGS. 6-10. As shown, the Iron 3 Piece Kit is displayed on the quote with tine status, labor, description, part number, warranty, list price, cost price, quantity, location, and other information, e.g., that was already shown in the previous Figures. As indicated above, all of the displays, input options, layouts, etc. shown in the Figures are exemplary only and are not intended to limit the scope of the invention. Thus, the quote may include repair information, e.g., the price and description of parts chosen for the repair.

Figure 12:
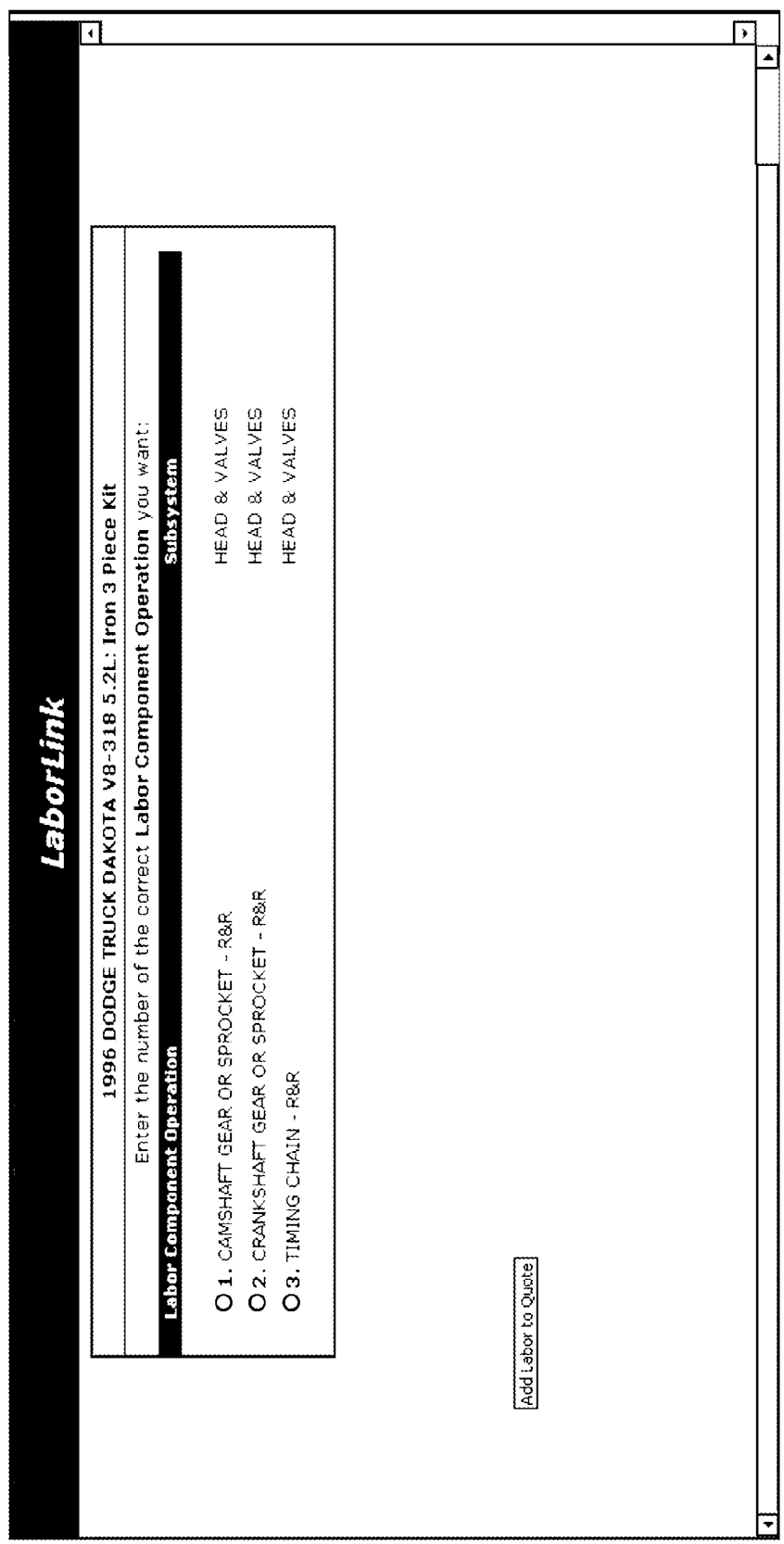

FIG. 12 is an exemplary website which may be displayed when the user chooses to view the labor information, e.g., by selecting the "L" button displayed on various ones of the websites in FIGS. 8-11. Following the Iron 3 Piece Kit example from above, the user may need to choose between various jobs associated with the parts in the 3 Piece Kit. As shown, the user may need to perform a remove and replace on the camshaft gear, the crankshaft gear, or the timing chain, among other repair jobs. Additionally, the user may select one or more of these options and choose to add the labor to the quote using the "Add Labor to Quote" button. In some embodiments, the website may display the job choice every time the labor information is requested; however, the website may simply display this job choice when there is more than one job available. In other words, in one embodiment, the website may skip this particular window if there is only one job associated with the particular user specified part. Where there is not a job associated with the part, the website may allow the user to specify a job in the closest related area, e.g., cooling jobs where the user has selected a water pump as the part. Thus, the user may choose among a selection of jobs to request labor information, e.g., based on the selected part and vehicle information.

Figure 13:
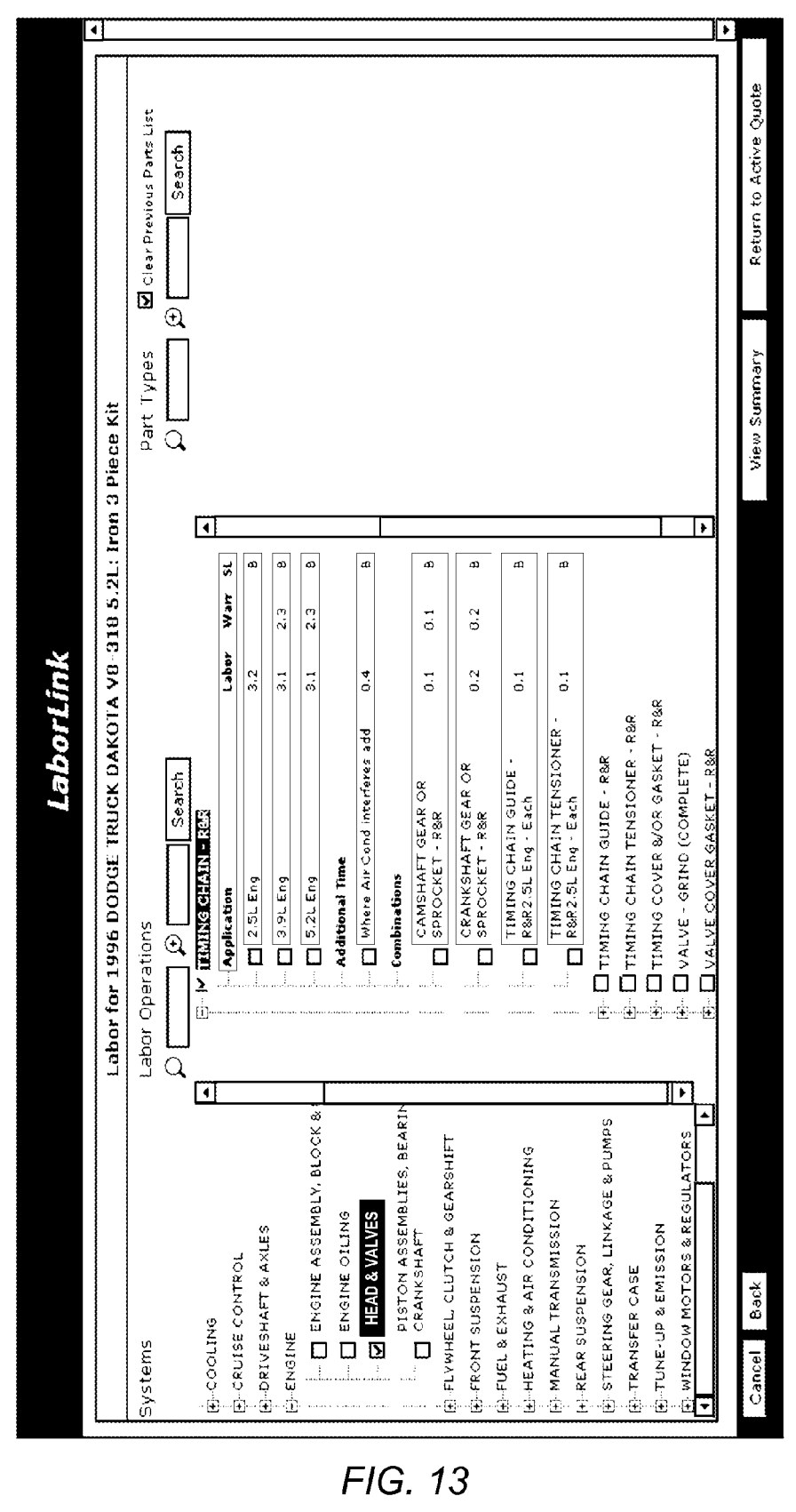

FIG. 13 is an exemplary website which allows the user to specify details for the labor that will be performed. Following the descriptions above, where the user has selected the Iron 3 Piece Kit and the timing chain remove and replace job, the website of FIG. 13 may be displayed without any further user information. In other words, the user may simply click the labor button and then the ask for a labor quote on the timing chain remove and replace, and this website may be displayed without any other information being provided by the user. Thus, the website may automatically choose the information on the left side of FIG. 13 (in the tree under "Systems" where "Engine" and "Head & Valves" are chosen) as well as the "Timing Chain—R&R" checked in the middle section. Here, the user may select what type of engine the labor applies to, e.g., 2.5 L, 3.9 L, or 5.2 L, other considerations for additional time, e.g., whether the air conditioning system interferes with the job, and other combination jobs, e.g., if the repair also includes a camshaft gear or sprocket R&R, a crankshaft gear or sprocket R&R, a timing chain guide, and/or timing chain tensioner, among other labor jobs (e.g., those listed in the labor operations section among others). Note that various of these selections may also be already selected using information already entered in by the user, e.g., if the user has provided the information. For example, if the user has already chosen the particular engine, the website may automatically select it for the user.

In some embodiments, this section may also include technical bulletins, manuals, diagrams or other information that may be purchased with respect to the vehicle, part, and/or job specified by the user, among others. As shown, the user may also choose to search for other jobs in the labor operations by using the search bar shown. In such embodiments, the user may simply type the name of a job/labor operation, and a list may be provided for selection by or automatically chosen for the user. Additionally, the user may instruct the website to clear previous parts list, e.g., already chosen or chosen in the previous session, view a summary of the selected labors and/or parts, return to the active quote, cancel, or go back one level, among other possibilities. Thus, the user may select appropriate jobs, operations, and/or other information to get labor information.

Figure 14:
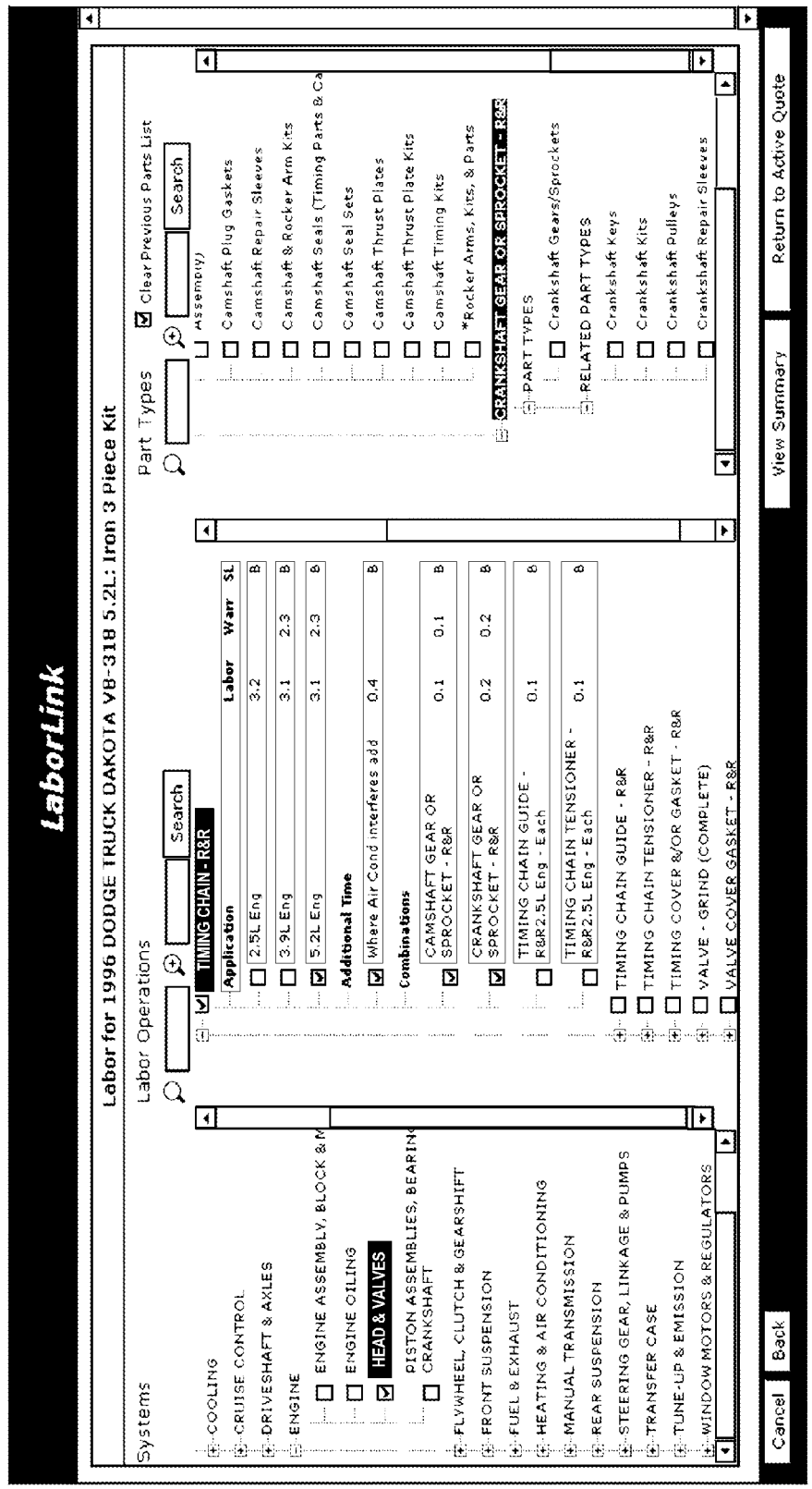

FIG. 14 is an exemplary website which shows the result of the user selecting the 5.2 L engine for the timing chain remove and replace where the air conditioner interferes as well as the cam shaft and crankshaft gear remove and replacements. As shown, appropriate categories of parts may be displayed in the part types section on the right of FIG. 14, allowing the user to select parts which may be required for the selected jobs.

FIG. 15 is an exemplary website which shows the summary of the quote, e.g., when the user selects the "Summary" button in various ones of the Figures. As shown, the summary includes the specified part and the labor associated with the jobs that may need to be performed, e.g., by the user. As shown, the summary may provide a total labor cost, a total parts cost, and/or a total labor and parts cost.

Figure 16:

FIG. 16 is an exemplary website which shows the active quote, e.g., after the user selects the "Active Quote" button in various ones of the Figures described above. As shown, the user may view the selected labor and parts as well as the quote summary information already described above. Additionally, the user may be able to modify various ones of the fields. For example, the user may be able to change the quantity of the parts, the labor rate associated with various ones of the jobs, the time required to perform them, and/or the extended cost, among others. As shown, the user may also remove various ones of the labor/parts from the quote. In one embodiment, the user may save, delete, update, and/or print the quote as well as recheck availability of various ones of the parts. Additionally, the user may send the order in order to complete the quote. In some embodiments, the website may automatically order the part for the user as well as supplying the order to the user, e.g., as a purchase order in the user's order system. Thus, FIGS. 6-16 provide one example of a complete transaction for a user. As described above, these descriptions are exemplary only and other embodiments are envisioned.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A computer-implemented method for providing labor cost information, the method comprising:
   receiving, by the computer, input specifying a vehicle and/or a vehicle system;
   receiving, by the computer, user input to the computer specifying part information, wherein the part information comprises a specific part;
   receiving, by the computer, user input to view repair jobs associated with the part information;
   providing, by the computer, a plurality of repair jobs associated with the specific part;
   receiving, by the computer, user input to view labor cost information associated with at least one of the repair jobs, wherein said receiving the user input to view the labor cost information is received after the user input specifying the part information and the input specifying the vehicle and/or the vehicle system; and
   automatically providing, by the computer, the labor cost information associated with the at least one of the repair job for display in response to the user input to view the labor cost information, wherein the labor cost information is automatically determined based on the vehicle and/or the vehicle system and the at least one repair job, wherein the labor cost information specifies a cost of labor for installing the specific part, and wherein said automatically providing the labor cost information is performed without further user input specifying the part information.

2. The method of claim 1, wherein the part information comprises a stock keeping unit (SKU) number.

3. The method of claim 2, further comprising:
   receiving descriptions associated with the SKU; and
   determining a part type based on the SKU and the descriptions;
   wherein said automatically providing the labor cost information is based on the part type.

4. The method of claim 1, wherein the part information comprises a part type, and wherein said automatically providing the plurality of repair jobs is based on the part type.

5. The method of claim 1,
wherein said receiving input specifying a vehicle and/or a vehicle system comprises receiving user input selecting a vehicle from a plurality of possible vehicles via one or more websites over a network;
wherein said receiving user input specifying part information comprises receiving user input selecting a part from a plurality of possible parts via the one or more websites;
wherein said receiving user input to view labor cost information associated with the part information is received to the one or more websites; and
wherein said automatically providing comprises receiving the labor cost information from the one or more websites and providing the labor cost information for display by the computer system.

6. The method of claim 1,
wherein said receiving input specifying a vehicle and/or a vehicle system is performed over a network, wherein said receiving user input specifying part information is performed over the network, wherein said receiving user input to view labor cost information associated with the part information is received over the network, and wherein said automatically providing is performed over the network.

7. The method of claim 1, further comprising:
providing a list of a plurality of possible vehicles and/or vehicle systems;
wherein said receiving user input specifying the vehicle and/or the vehicle system comprises selecting the vehicle and/or the vehicle system from the list of the plurality of possible vehicles and/or vehicle systems.

8. The method of claim 1, further comprising:
providing a list comprising the part information;
wherein said receiving user input specifying the part information comprises selecting the part information from the list.

9. The method of claim 1, wherein said receiving input specifying a vehicle and/or a vehicle system comprises receiving previously stored data regarding the vehicle and/or the vehicle system.

10. The method of claim 1, further comprising:
providing repair information, based on the vehicle and/or the vehicle system and the part information, wherein the repair information comprises technical service bulletins, wherein the technical service bulletins are specific to the vehicle, vehicle system, and/or the part information.

11. The method of claim 1, further comprising:
providing repair information, based on the vehicle and/or the vehicle system and the part information, wherein the repair information comprises repair procedures, wherein the repair procedures are specific to the vehicle, vehicle system, and/or the part information.

12. The method of claim 1, wherein the plurality of repair jobs comprise one or more correlated activities associated with the at least one repair job, wherein the method further comprises:
receiving input selecting one or more of the correlated activities, wherein the labor cost information is also based on the one or more of the correlated activities.

13. The method of claim 1, further comprising:
providing one or more part types associated with the at least one repair job;
receiving input selecting at least one part type of the one or more part types;
providing one or more specific parts of the at least one part type.

14. A non-transitory memory medium comprising program instructions for providing repair information, wherein the program instructions are executable by a processor to implement:
providing one or more websites comprising part information for display, wherein the part information comprises at least one of a plurality of possible vehicles and/or a plurality of possible parts;
receiving user input to the one or more websites specifying a vehicle from the plurality of possible vehicles;
receiving user input to the one or more websites specifying a specific part of the plurality of possible parts;
providing a plurality of repair jobs associated with the specific part;
receiving user input to the one or more websites to view labor cost information associated with the at least one repair job of the plurality of repair jobs; and
automatically providing the labor cost information associated with the at least one repair job for display in response to the user input to the one or more websites to view the labor cost information, wherein the labor cost information is based on the vehicle and the part, wherein the labor cost information specifies a cost of labor for installing the part, wherein said automatically providing the labor cost information is performed without further user input specifying the part.

15. The non-transitory memory medium of claim 14, wherein said automatically providing the repair information associated with the part for display is performed without further user input specifying the vehicle.

16. The non-transitory memory medium of claim 14, wherein the one or more websites comprise a GUI element that indicates the repair information;
wherein said receiving user input to the one or more websites to view the labor cost information comprises receiving user input to the GUI element.

17. The non-transitory memory medium of claim 14, wherein said automatically providing the labor cost information associated with the at least one repair job for display comprises accessing a rules engine to obtain the labor cost information of the at least one repair job.

18. The non-transitory memory medium of claim 14, wherein the part has a part name, and wherein the program instructions are further executable to implement:
accessing a rules engine to determine a normalized part type for the part name;
accessing the rules engine to determine the labor cost information for the normalized part type.

* * * * *